Sept. 9, 1958 A. R. JONES 2,851,111
PNEUMATIC PACKER
Filed Sept. 26, 1955

INVENTOR.
A. RAYMOND JONES
BY *Philip H. Sheridan*
ATTORNEY

2,851,111
PNEUMATIC PACKER

A Raymond Jones, Dallas, Tex.

Application September 26, 1955, Serial No. 536,365

1 Claim. (Cl. 166—187)

This invention relates to open hole packers and more particularly to pneumatic packers.

It has become accepted practice in the petroleum, construction and other industries to seal off a portion of a bore in order that certain tests may be performed on the surrounding formation or other operations performed which will aid in evaluation of the bore. A packer is commonly used to seal off the bore so that fluids may be circulated above or below it for testing, cleaning, treating and cementing the bore and surrounding formations. A pair of spaced packers are sometimes used to isolate a short section of the bore so that a test may be made therefrom, such as formation testing for porosity and permeability.

Pneumatic packers are finding wide application in various types of holes or bores for formation testing as related to dam foundations, tunnel bores, building foundations, etc. and for pressure grouting. Also, they may be used in well bores and the description which follows will be directed to this use, although by no means limited thereto.

Packers are frequently immersed in fluid or other liquid in a bore and subjected to high temperatures and pressures that may cause them to rupture or otherwise fail to operate. Serious and irreparable damage may take place in the bore, either directly from the failure of the packer or as a result of the time which is lost in repairing or replacing in. Therefore, it becomes imperative that the packer be designed and constructed in a manner which will substantially eliminate any failures when in service.

It is therefore an object of this invention to provide an improved packer of the open hole type.

More specifically, it is an object of the invention to provide a pneumatic open hole packer which is equipped with an improved and simplified connection between the flexible member and the fittings on the upper and lower ends thereof which will not fail, even though subjected to extreme conditions in service.

It is also an object of the invention to provide a packer which is designed to utilize an air supply for expanding the flexible member which is entirely independent of the main pipe from which the packer is suspended, thus leaving the main line open for the introduction or withdrawal of the various fluids used in treating and testing the bore.

Another object of the invention is the provision of a packer which can easily be inflated from the surface of the bore with a compressor, a bottle of compressed air, or a hand pump.

Further objects of the invention are the provision of a packer which is easily dismantled and repaired in the field, readily adapted to use with conventional well drilling equipment, and a packer which is rugged and dependable.

Other objects will be in part apparent and in part pointed out specifically hereinafter in connection with the description of the drawings which follow, and in which.

Figure 3:
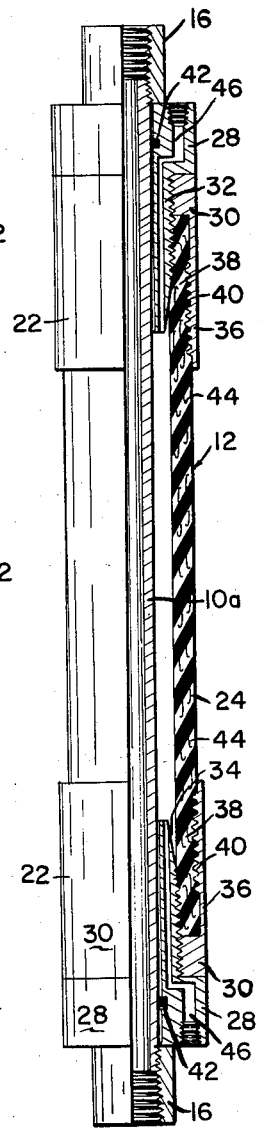
Figure 3 is an enlarged elevation of the packer in deflated condition with one-half thereof being shown in section.

Referring now to the drawing, reference numeral 10 represents a section of pipe from which the packer, indicated in a general way by numeral 12, is suspended within a well bore or the like 14. Each packer is mounted upon a short section of pipe 10a, shown in Figures 3 and 4, which is attached to pipe 10 by means of collar 16 which serves as a retaining ring to maintain the packer in position on pipe 10a.

Figure 2:
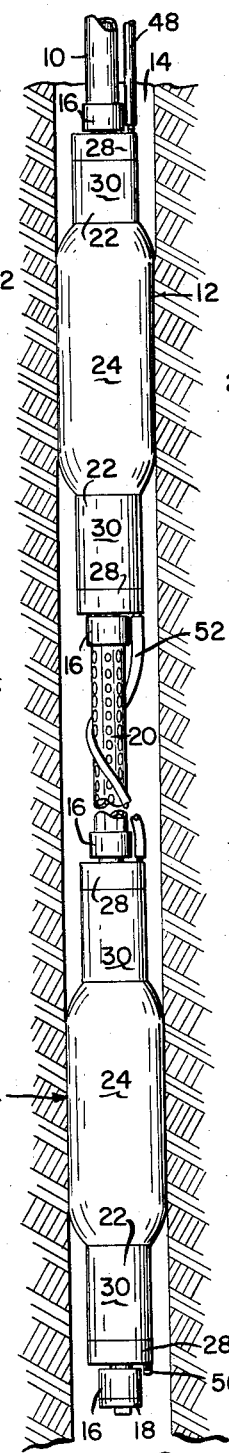
Figure 2 is an elevation similar to Figure 1 showing two of the packers in spaced relation on the ends of the perforated pipe section isolating a short section of the bore, a portion of the assembly having been broken away to conserve space.

Pipe section 10a is also provided with a collar 16 on the lower end into which may be connected any of several types of conventional fittings such as the plug 18 and the perforated pipe section 20 shown in Figure 2. The lower collar prevents the packer from sliding off the end of pipe 10a.

Each packer consists of two identical fittings 22 longitudinally spaced from one another between the collars; and, a flexible member 24 the ends of which are securely fastened within the fittings. Each fitting 22 is carried upon pipe 10a for axial slidable movement. An annular sealed air chamber 26 is formed around pipe 10a by the flexible member and the fittings which provide a closure for the ends of the air chamber. Each fitting 22 comprises a male element 28 and a female element 30 threadedly attached to one another. Male element 28 is formed with an externally threaded tubular portion 32 which terminates in a tapered end 34 sized to enter the end of the flexible member. Female element 30 is internally threaded to receive tubular portion 32 of the male element. The female element is provided with a tubular portion 36 of greater inside diameter than the outside diameter of tubular portion 32 of the male member. When the male and female elements are in threaded engagement with one another, as shown most clearly in Figure 3, tubular portions 32 and 36 lie in spaced coaxial relation to one another, thus defining an annular passage 38 therebetween which is open at one end to receive the end of flexible member 24. Tubular extension 36 of the female element is preferably provided with internal serrations 40 which coact with the external thread on tubular portion 32 to form a gripping surface to engage the wall of the flexible member. Annular passage 38 is thinner than the thickness of the wall of the flexible member resulting in the flexible member being squeezed between the tubular portions of the male and female elements when the male element is threaded into the female element and the end of the flexible member. The internal diameter of tubular portion 36 is such that flexible member 24 will fit snugly inside without causing a fold to form in the wall. Tapered end 34 of the male element is sized to enter the end of the flexible member and as the tubular portion 32 is threaded further into the female element the wall of the flexible member is squeezed against the serrated face of tubular extension 36. Thus, the male and female elements of each fitting provide a secure grip upon the flexible member. Each male element 28 and thus each fitting 22 is slidable along pipe 10a and provided with an O-ring 42 which provides an airtight seal therebetween.

Figure 4:
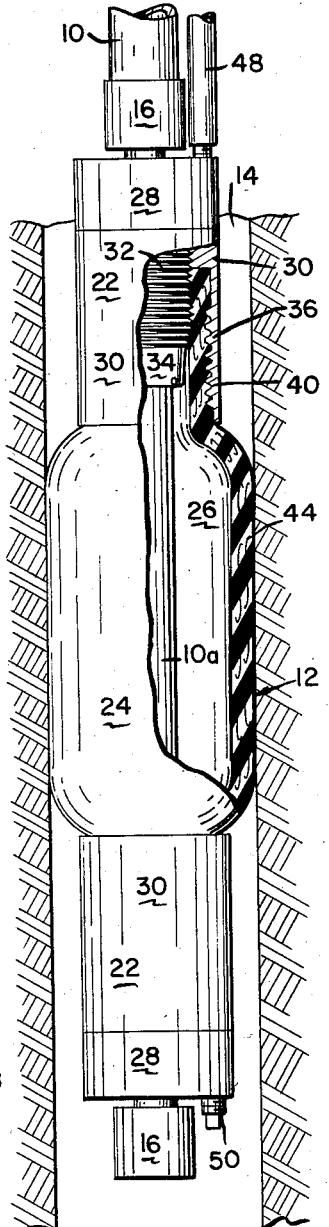
Figure 4 is an elevation similar to Figure 3 showing the packer in expanded condition with a portion thereof being broken away to expose the connection between the flexible member and the upper fitting.

Flexible member 24 is preferably provided with suitable fabric or cord reinforcing 44 to prevent rupture under the conditions of extreme pressure to which the flexible member will be subjected. It is to be noted that flexible member 24 need not, due to construction, stretch longitudinally to any appreciable extent which would cause the wall to become thinner, as the fittings 22 are mounted to move axially toward one another when the flexible member is inflated as shown in Figure 4. Thus, a stronger reinforced flexible member may be and is used. However, in actual operation, the fittings 22 frequently do not move toward one another to any appreciable extent, due to the force acting upon the O-rings when the air chamber 26 is pressurized and thus there is substantial deformation of member 24 over and above the provided radial elasticity.

Male element 28 is provided with an air passage 46 communicating the exterior of the packer 12 with the interior of annular air chamber 26. An air hose 48 is connected into the air passage 46 and furnishes air to the annular air chamber 26 from a source of high pressure air on the surface, not shown, for inflation of the packer. It is to be noted that flexible member 24 is inflated from its own independent air supply so that inflation and deflation of the packer does not interfere in any way with the operations being carried on by means of pipes 10 and 10a.

Figure 1:
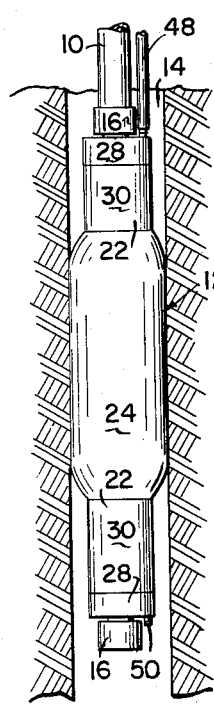
Figure 1 is an elevation showing the improved pneumatic packer of the present invention in expanded condition within a well bore.

Figure 1 illustrates the use of one packer in a well bore and it is to be noted that air passage 46 in the lower fitting 22 is sealed with a plug 50 so that the flexible member may be inflated.

In Figure 2, two packers are used in spaced relation, separated by a perforated pipe section 20 and only the air passage in the bottom fitting of the lower packer is provided with a plug. The air passages 46 on the adjacent fitting of the two packers are interconnected by means of a flexible conduit 52 so that the air may pass from the upper packer to the lower and inflate both flexible members. A flexible conduit is necessary in order that the adjacent fittings 22 on each packer may be free to slide axially away from one another as the flexible members are distended. The arrangement shown in Figure 2 is used to seal off a small increment of the well bore so that fluids, such as those used in formation testing and grouting, may be placed in the sealed area by means of perforated pipe 20. In this connection it is necessary to provide plug 18 in the end of the bottom collar 16.

From the above detailed description, it should be apparent that the present packer construction has many advantages in operation and construction. In addition to those objectives mentioned, it should be pointed out that the structure may be easily dismantled in the field for conducting repairs or substitution of parts, such as a new flexible member 24, the latter incidentally being strong and sufficiently thick to withstand abrasion from pump pulsations and also being made resistant to oils and gases.

Having thus described the useful and novel features of construction of the present invention in connection with the description of the drawing, it will be seen that the useful objects for which it was designed have been achieved.

I claim:

A pneumatic well packer for sealing an open bore comprising a cylindrical imperforate pipe section, a collar connected to each end of the pipe section, at least one of said collars being detachable therefrom, a radially distensible resilient tubular member encasing the central portion of the pipe section, a fitting attached to each end of the resilient member and mounted on the pipe between the collars for axial slidable movement along the pipe, said fittings forming an air-tight seal with the pipe and coacting with the resilient member to form an annular air chamber between the pipe and resilient member, the fittings each having a male and a female element in threaded air-tight engagement with one another, the male and female elements of the fittings each being provided with a tubular portion positioned in spaced coaxial relation to one another and defining an annular passage open at one end to receive and grip the end of the resilient member, the male element having an air passage communicating the exterior thereof with the interior of the air chamber, means connectable into the air passage in one of the male elements while the air passage in the other of said male elements is closed for introducing air into the air chamber to expand the flexible member into sealed contact with the wall of an open bore, the end of the male element adjacent each open end of the annular passage being tapered for insertion into an end of the flexible member, the opposed surfaces of the tubular portions defining the annular passage being provided with serrated sections adapted to engage and grip the wall of the flexible member, and the flexible member having embedded therein reinforcing material to render said member substantially non-elastic in a longitudinal direction so that inflation of the packer will cause the fittings to slide toward one another.

References Cited in the file of this patent

UNITED STATES PATENTS

| | | |
|---|---|---|
| 2,026,883 | Gillespie | Jan. 7, 1936 |
| 2,061,993 | Baker | Nov. 24, 1936 |
| 2,098,484 | Brundred et al. | Nov. 9, 1937 |
| 2,196,658 | Burt | Apr. 9, 1940 |
| 2,227,729 | Lynes | Jan. 7, 1941 |
| 2,227,730 | Lynes | Jan. 7, 1941 |
| 2,301,190 | Boynton | Nov. 10, 1942 |
| 2,611,437 | Lynes | Sept. 23, 1952 |
| 2,738,014 | Lynes | Mar. 13, 1956 |

FOREIGN PATENTS

| | | |
|---|---|---|
| 756,396 | France | Dec. 8, 1933 |